US012670180B2

(12) United States Patent
Xie et al.

(10) Patent No.: US 12,670,180 B2
(45) Date of Patent: Jun. 30, 2026

(54) DECLARATIVE COMPUTER FRAMEWORK SIGNAL PROPAGATION

(71) Applicant: Microsoft Technology Licensing, LLC, Redmond, WA (US)

(72) Inventors: Yin Xie, Bellevue, WA (US); Ahmed Hassan Mohamed, Bellevue, WA (US); Danilo Landucci Benzatti, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/785,763

(22) Filed: Jul. 26, 2024

(65) Prior Publication Data

US 2026/0030258 A1 Jan. 29, 2026

(51) Int. Cl.
  *G06F 16/27* (2019.01)
  *G06F 11/34* (2006.01)
(52) U.S. Cl.
  CPC .......... *G06F 16/27* (2019.01); *G06F 11/3438* (2013.01)
(58) Field of Classification Search
  CPC ...... G06F 16/27; G06F 16/273; G06F 16/275; G06F 16/278; G06F 11/3438
  USPC ........................................................ 707/634
  See application file for complete search history.

(56) References Cited

U.S. PATENT DOCUMENTS

| | | | | |
|---|---|---|---|---|
| 7,970,746 B2 * | 6/2011 | Seshadri | ................. | H04L 63/20 |
| | | | | 707/694 |
| 2005/0091346 A1 * | 4/2005 | Krishnaswami | .... | G06F 9/44505 |
| | | | | 719/310 |
| 2007/0294312 A1 * | 12/2007 | Seshadri | ............... | H04L 41/024 |
| 2021/0326358 A1 * | 10/2021 | Seelemann, II | ...... | G06F 16/273 |

FOREIGN PATENT DOCUMENTS

WO 2019019766 1/2019

OTHER PUBLICATIONS

Extended European Search Report Received in European Patent Application No. 25190369.6 mailed on Oct. 6, 2025, 10 pages.

* cited by examiner

*Primary Examiner* — Michael Pham
(74) *Attorney, Agent, or Firm* — Schwegman Lundberg & Woessner, P.A.

(57) ABSTRACT

A computer-implemented method for managing data in a computing environment. In one aspect, a method includes receiving a declarative input that indicates an outcome for data handling, identifying, from the declarative input, a predefined data filter configuration and a predefined data propagation configuration, filtering incoming data according to the predefined data filter configuration to generate filtered data, and replicating the filtered data to a data storage according to the predefined data propagation configuration.

18 Claims, 10 Drawing Sheets

_—700_

RECEIVE A DECLARATIVE INPUT THAT INDICATES AN OUTCOME FOR DATA HANDLING 702

IDENTIFY, FROM THE DECLARATIVE INPUT, A PREDEFINED DATA FILTER CONFIGURATION AND A PREDEFINED DATA PROPAGATION CONFIGURATION 704

FILTER INCOMING DATA ACCORDING TO THE PREDEFINED DATA FILTER CONFIGURATION TO GENERATE FILTERED DATA 706

REPLICATE THE FILTERED DATA TO A DATA STORAGE ACCORDING TO THE PREDEFINED DATA PROPAGATION CONFIGURATION 708

700

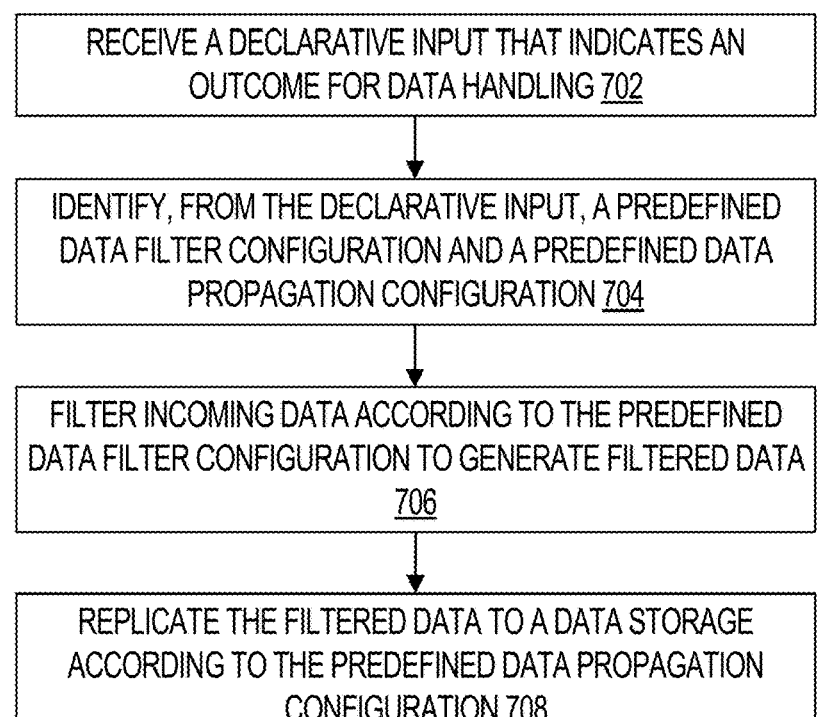

RECEIVE A DECLARATIVE INPUT THAT INDICATES AN OUTCOME FOR DATA HANDLING 702

IDENTIFY, FROM THE DECLARATIVE INPUT, A PREDEFINED DATA FILTER CONFIGURATION AND A PREDEFINED DATA PROPAGATION CONFIGURATION 704

FILTER INCOMING DATA ACCORDING TO THE PREDEFINED DATA FILTER CONFIGURATION TO GENERATE FILTERED DATA 706

REPLICATE THE FILTERED DATA TO A DATA STORAGE ACCORDING TO THE PREDEFINED DATA PROPAGATION CONFIGURATION 708

FIG. 7

```
{
    "SignalType":"FileModified",                                        804
    "Compliance":"EUII",
    "IsPrivate":false,
    "CV":"1111-1111-1111",
    "CreationTime":"2024-07-21T14:25:19.10359382",
    "StartTime":"2024-07-21T14:25:18Z",
    "EndTime":"2024-07-21T14:25:18Z",
    "DurationInSeconds":0,
    "Status":"Completed",
    "Application": {
        "AadAppId":"00000003-0000-0ff1-ce00-000000000000",
        "AppName":"OneDrive for Business",
        "Workload":"SPO"
    },
    "Device": {
        "UserAgent":"Microsoft Office Excel 2014",
        "ClientIp":"127.0.0.1"
    },
    "Item": {
        "ItemType":"File",
        "ItemId":"111111111"
    },
    "CustomProperties": {
        "SiteUrl":""nttps://microsoft-my.sharepoint.com/personal/user_microsoft_com/",
        "SourceRelativeUrl":"Documents/Onboarding",
        "SourceFileName":"How to index my toy?",
        "SourceFileExtension":"docx",
        "Site":"SiteShard",
        "SPOItemType":"File",
        "UserAgent":"Microsoft Office Excel 2014",
        "ObjectId":"https://microsoft-my.sharepoint.com/ObjectId",
        "UserID":"willxie@microsoft.com",
        "RecordType":"6",
        "Operation":"FileModified:",
        "OrganizationID":"00000000-86f1-41af-91ab-2d7cd011db47",
        "WebTemplateId":"21",
        "MachineName":"1111-1111-1111",
        "ProcessAuditingIdentity":"w3wp_SharePoint Content Services_2",
        "SequenceNumber":1111,
        "ItemActivity": {
            "edit": {},
            "version": {}
        },
        "ActordisplayName":"Will Xie",
        "PageReadPercentage":1.0,
        "Authors":[
            {
                "Id":"2595cf3c-827b-423f-a4aa-323464c79400",
                "DisplayName": "Ian Xie"
            },
            {
                "ID":"2595cf3c-827b-423f-a4aa-323464c79401",
                "DisplayName": "Daniel Xie"
            },
            {
                "ID":"2595cf3c-827b-423f-a4aa-323464c79402"
                "DisplayName": "Will Xie"
            }
        }
    }
}
```

EXAMPLE USER DATA

```
NotificationRelativePath=SignalPropagation/api/griffinNotifications/itemSignalPropagationProcessor?scenario=WhoTouchedMyFile
RestItemFilter=/me/signals?$filter=(SignalType eq 'FileModified')
EnableMailboxTypes=User,Business,UserShard,MailUserShard
```

904

```
[WhoTouchedMyFile]
 _meta.type=Microsoft.SignalPropagation.VariantConfiguration.IPropagationScenarioSettings
Scenario=WhoTouchedMyFile
IsEnabled=true
Destination=$"SPO_{Signal.CustomProperties.Site}@SPO_{Context.TenantId}"
DestinationType=SingleShard
```

906

```
[WhoTouchedMyFile]
 _meta.type=Microsoft.SignalPropagation.VariantConfiguration.IPropagationScenarioSettings
Scenario=WhoTouchedMyFile
IsEnabled=true
Destination=$"app:WhoTouchedMyFileElasticStorage_{Signal.CustomProperties.Site}@{Context.TenantId}"
DestinationType=ESS
```

908

```
[WhoTouchedMyFile]
 _meta.type=Microsoft.SignalPropagation.VariantConfiguration.IPropagationScenarioSettings
Scenario=WhoTouchedMyFile
IsEnabled=true
Destination=$"app:WhoTouchedMyFileElasticStorage_{Signal.CustomProperties.Site}@{Context.TenantId}"
DestinationType=ESS
PartitionKey=$"{Signal.Item.ItemId}"
```

910

```
[WhoTouchedMyFile]
 _meta.type=Microsoft.SignalPropagation.VariantConfiguration.IPropagationScenarioSettings
Scenario=WhoTouchedMyFile
IsEnabled=true
Destination=$""OID:{Resolve{Signal.CustomProperties.Authors[*].Id}}@{Context.TenantId}"
DestinationType=ESS
PartitionKey=$"{Signal.Item.ItemId}"
```

FIG. 9

DECLARATIVE COMPUTER FRAMEWORK SIGNAL PROPAGATION

TECHNICAL FIELD

The subject matter disclosed herein generally relates to the technical field of data management systems. Specifically, the present application pertains to a Declarative Compute Framework (DCF) that facilitates signal propagation, data filtering, control, and replication through a declarative approach.

BACKGROUND

In the field of data management, traditional systems often require users to engage in complex procedural programming to specify how data should be handled, filtered, and replicated. This approach not only increases the complexity and potential for errors but also demands a high level of technical expertise, which can hinder operational efficiency and scalability. Existing solutions typically separate data management and analysis processes, leading to inefficiencies and a lack of integration that can stifle timely decision-making and innovation. Furthermore, the rigidity of these systems often makes it difficult to adapt to evolving data requirements or to integrate new types of data sources and destinations efficiently.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 is a flow diagram illustrating a method for operating the declarative compute framework platform in accordance with one example embodiment.

FIG. 8 illustrates an example of user data in accordance with one example embodiment.

FIG. 9 illustrates examples of configurations in accordance with one example embodiment.

DETAILED DESCRIPTION

Figure 1:
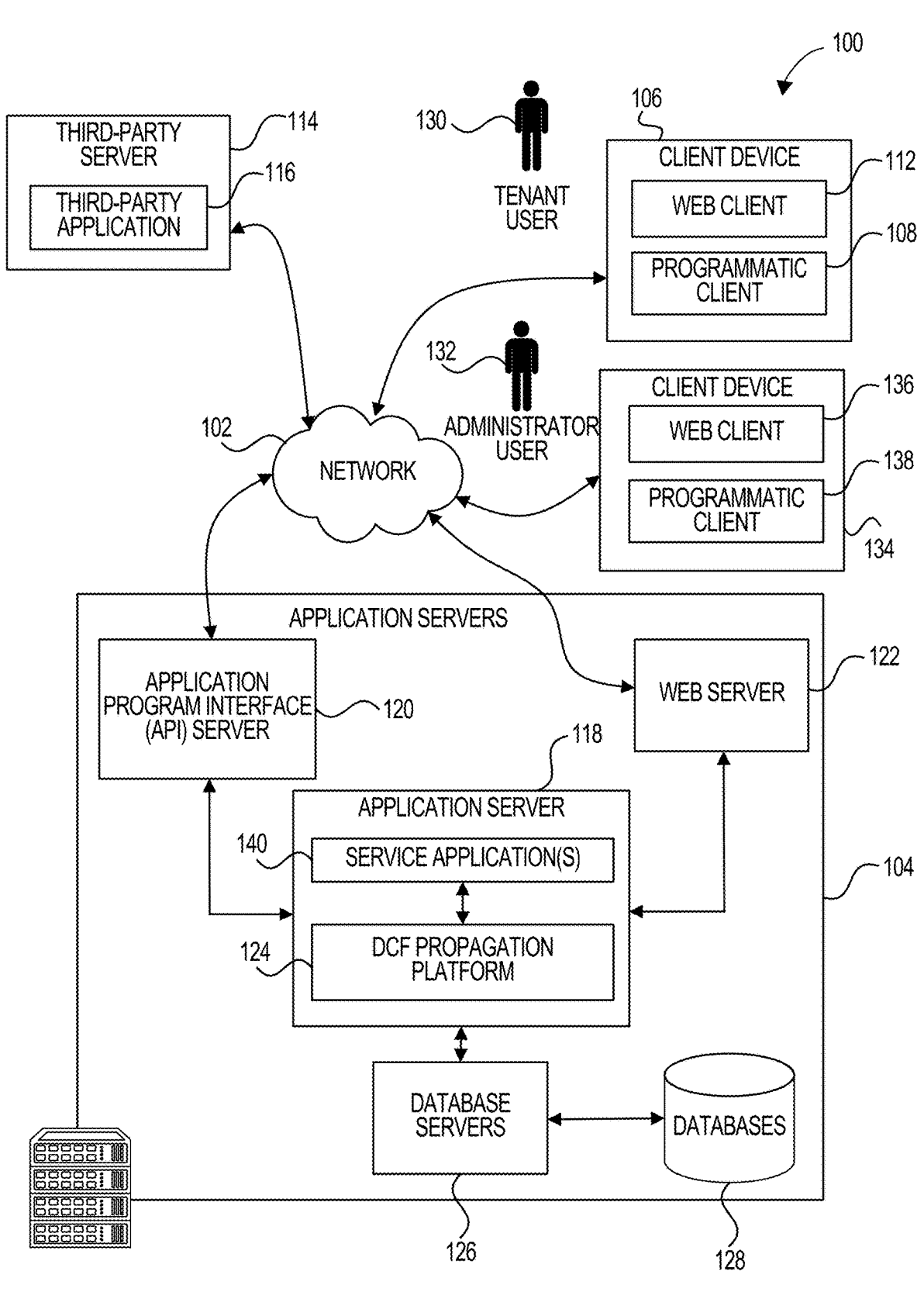
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The Declarative Compute Framework (DCF) for Signal Propagation is designed to simplify and improve the way data is filtered, controlled, replicated, and analyzed across different systems. The declarative model of the DCF allows users to specify desired outcomes, like data filtering and replication destinations, without needing to understand the complexities of the underlying execution processes. This user-centric approach reduces the learning curve associated with traditional data management systems and minimizes the potential for errors by simplifying complex configurations into more manageable templates.

In one example embodiment, DCF includes the Filtering Configuration Templates and Propagation Configuration Templates. These templates serve as the building blocks of the framework, encapsulating the intricacies of data control and replication tasks into predefined, easily adjustable configurations. This standardization automates and streamlines common data management operations, thereby enhancing efficiency and scalability. The templates are designed to be flexible and adaptable, accommodating changes in data requirements and system configurations with minimal user intervention.

Furthermore, the DCF framework incorporates data replication and analysis by automatically directing replicated data to a central location for thorough analysis. This integration allows for almost real-time data analytics, giving users timely insights to inform decision-making. The framework's quick integration and testing capabilities also highlight its efficiency, enabling users to test their data setups in a production environment within a short period.

In one example embodiment, a computer-implemented method for managing data in a computing environment is described. In one aspect, a method includes receiving a declarative input that indicates an outcome for data handling, identifying, from the declarative input, a predefined data filter configuration and a predefined data propagation configuration, filtering incoming data according to the predefined data filter configuration to generate filtered data, and replicating the filtered data to a data storage according to the predefined data propagation configuration.

The methodologies described in this document help to solve the technical problem of using separate data management and analysis processes. This process slows down significantly and increases the computational load. These methodologies may eliminate the need for certain computing resources such as processor cycles, network traffic, memory usage, data storage capacity, power consumption, network bandwidth, and cooling capacity.

In an example, the term "domain" as used here refers to the classification of data based on its type, source, or nature. For example, user data, transaction data, or sensor data could each be considered different domains. This classification helps in effectively managing data, applying specific processing rules, and maintaining data integrity. In other contexts, the term "domain" can also refer to a specific technical environment or platform where data operations are carried out. For instance, in cloud computing, a domain might refer to a particular set of services or a configuration within a cloud provider's offerings, such as Azure's environment where data processing and storage services like Azure Data Lake or Synapse operate. "Azure" is a trademark of Microsoft Inc.

In an example, the term "tenant" as used here refers to a customer or an organization that subscribes to cloud services provided by a host company. This term can also be used in cloud computing and software-as-a-service (SaaS) models to describe an independent instance of the software application and its associated data. Each tenant's data is isolated and remains invisible to other tenants. In the specific context of the present application, a tenant would be an entity, such as a company or organization, that uses the cloud-based platform for creating, managing, and utilizing semantic indexes for their data. This data could include files, emails, and other content types (e.g., videos, charts, text, and audio).

In an example, the term "substrate" used herein, refers to an infrastructure layer that provides essential services and capabilities for data processing, such as data storage, data management, and connectivity.

In an example, the term "data signal" used herein, refers to any form of digital information generated by user interactions, system processes, or sensor outputs that can be captured and analyzed to derive insights. This encompasses a wide range of data types, including but not limited to clicks, transactions, log entries, sensor readings, and other forms of user-generated or system-generated data. In a broader context, "data signals" can also be considered as "records," where each record represents a discrete instance of data captured at a specific point in time or under specific conditions. These records are structured and stored in databases or data lakes and are used to track, analyze, and predict patterns or behaviors based on the accumulated data.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106 and client device 134. A tenant user 130 operates the client device 106. The client device 106 includes a web client 112 (e.g., a browser) and a programmatic client 108 (e.g., an incident management application) that is hosted and executed on the client device 106. An administrator user 132 operates the client device 134. The client device 134 includes a web client 136 and a client device 134. The administrator user 132 is typically responsible for the configuration, management, and oversight of service application(s) 140 and/or DCF propagation platform 124 operations from an administrative perspective. The administrator user 132 has elevated privileges that allow them to set up and modify the system settings, manage user access controls, and oversee the overall health and security of the service application(s) 140 and/or DCF propagation platform 124.

The tenant user 130 refers to individuals who are consumers of the service application(s) 140's capabilities within a specific tenant environment. The tenant user 130 interacts with service application(s) 140 and DCF propagation platform 124 primarily through web client 112 or programmatic client 108, to perform various data-related tasks where the user interactions and activities result or generate data signals.

An Application Program Interface (API) server 120 and a web server 122 provide respective programmatic and web interfaces to application servers 104. A specific application server 118 hosts a service application(s) 140 and a DCF propagation platform 124 that includes components, modules, and/or applications (described in more detail below with respect to FIG. 2.

In the example context of enterprise applications, the service application(s) 140 includes applications used within businesses, such as Microsoft Office suite, CRM (Customer Relationship Management) systems, ERP (Enterprise Resource Planning) software, and collaboration tools like Microsoft Teams, generate signals from user interactions with the software. The signal data can be used to analyze user behavioral data, optimize workflows, enhance productivity, and improve user experience.

The DCF propagation platform 124 connects with the service application(s) 140. In one scenario, the DCF propagation platform 124 receives signal data from the service application(s) 140, which indicates user interactions or operations from the tenant user 130. The DCF propagation platform 124 is designed to simplify and improve the process of data management, with a specific focus on efficiently and flexibly propagating data signals. It operates based on a declarative model, allowing users to specify their desired outcomes for data handling, such as filtering, control, and replication, without needing to engage in complex procedural programming. By using configuration templates, the DCF propagation platform 124 abstracts the complexities of data management, enabling users to easily integrate their specific requirements. Once the user inputs are received, the DCF propagation platform 124 translates these into actionable configurations using its Propagation Expression language model. This model simplifies the definition of where and how data should be replicated across various storage systems. Subsequently, the DCF propagation platform 124 executes these configurations, ensuring that data is filtered, controlled, and replicated according to user specifications, and ultimately stored in a unified location for real-time analysis. This approach not only enhances operational efficiency but also reduces the potential for errors. An example embodiment of the DCF propagation platform 124 is described further below with respect to FIG. 2.

The application server 118 is shown to be communicatively coupled to database servers 126 that facilitates access to an information storage repository or databases 128. In an example embodiment, the databases 128 include storage devices that store information to be processed by the DCF propagation platform 124.

Additionally, a third-party application 116 may, for example, store another part of the DCF propagation platform 124, or include a cloud storage system. For example, the third-party application 116 stores other signal data related to the application servers 104. In another example, the third-party server 114 is associated with another server farm that is different from the server farm of the application servers 104. The third-party application 116 executing on a third-party server 114, is shown as having programmatic access to the application server 118 via the programmatic interface provided by the Application Program Interface (API) server 120. For example, the third-party application 116, using information retrieved from the application server 118, may support one or more features or functions on a website hosted by the third party.

Figure 2:
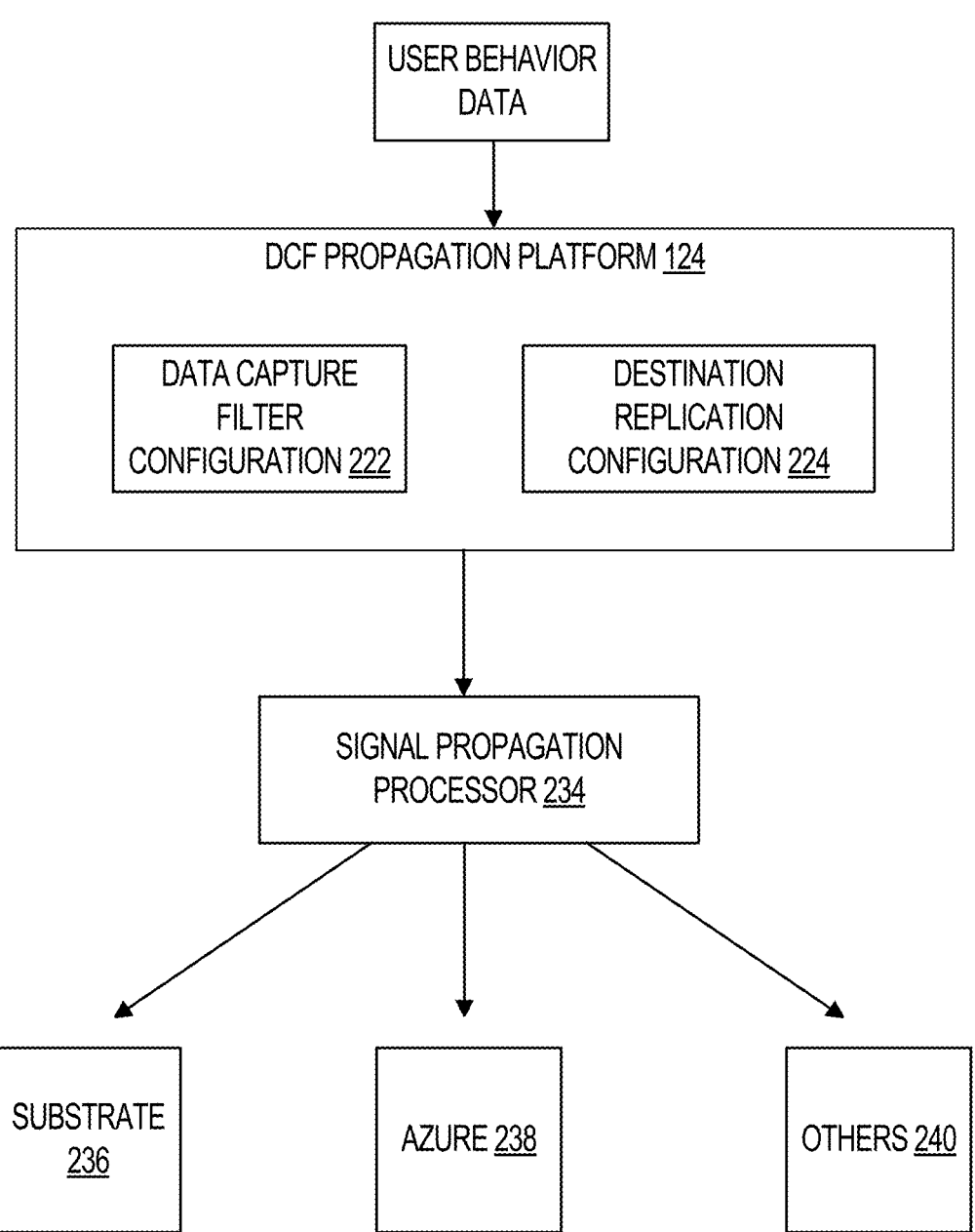
FIG. 2 is a block diagram illustrating a declarative compute framework platform in accordance with one example embodiment.

FIG. 2 is a block diagram illustrating a DCF propagation platform 124 in accordance with one example embodiment. FIG. 2 provides a schematic representation of the system's architecture and operational flow, for understanding the innovative aspects of the DCF propagation platform 124 and the signal propagation processor 234.

The DCF propagation platform 124 receives data such as user behavior data. This represents the raw data collected based on user activities and interactions. In another example, the DCF propagation platform 124 receives a user input specifying desired outcomes for data handling.

The DCF propagation platform 124 includes a data capture filter configuration 222 and a destination replication configuration 224. The data capture filter configuration 222 selectively processes incoming user behavior data before it reaches the Signal Propagation Processor (234). In one example, the data capture filter configuration 222 is responsible for implementing the initial layer of data filtering based on specific criteria defined within the DCF propagation platform 124. It ensures that only relevant data, as determined by predefined filtering rules, is forwarded for further processing and analysis. This selective filtering optimizes the performance of the data management system by reducing unnecessary data load and focusing on pertinent information that aligns with the user-defined outcomes. The destination replication configuration 224 specifies the target destinations for data after it has been processed by the Signal Propagation Processor (234). The destination replication configuration 224 identifies where the filtered and processed data is to be replicated, ensuring that it is directed to appropriate storage systems or analysis tools as defined by the system's requirements. The destination replication configuration 224 allows for a high degree of customization and flexibility, supporting a variety of storage options such as cloud services, databases, or proprietary data centers. By defining the replication paths and destinations, destination replication configuration 224 ensures that data is not only stored securely but is also positioned for optimal accessibility and utility in subsequent data analysis or operational processes.

The signal propagation processor 234 receives data from DCF propagation platform 124 and manages the flow and transformation of data according to the configurations set by the data capture filter configuration 222 and destination replication configuration 224. The signal propagation processor 234 operates by applying algorithms to process incoming user behavior data, ensuring that it conforms to the specified filtering criteria before directing it to the appropriate destinations. Its role is to maintain the integrity and efficiency of data management within the system, facilitating the seamless transition of data from its raw form into actionable insights or storage solutions. The signal propagation processor 234 sends the transformed data to a combination of destinations: substrate 236, Azure 238, or others 240

The substrate 236 provides the necessary computational and infrastructural resources that facilitate the seamless execution of data filtering and replication tasks. It ensures that the processor has the requisite support for high-performance data handling and management.

Azure 238 represents Microsoft Azure services. This integration allows for extended data processing, storage, and analysis capabilities, leveraging Azure's cloud infrastructure to enhance the scalability and flexibility of the Azure 238.

Others 240 refer to additional external systems or components not explicitly detailed. The DCF propagation platform 124 is designed with modularity, capable of integrating with a variety of other data sources, processing tools, and storage solutions, thereby enhancing the platform's utility and adaptability in diverse operational environments.

Figure 3:
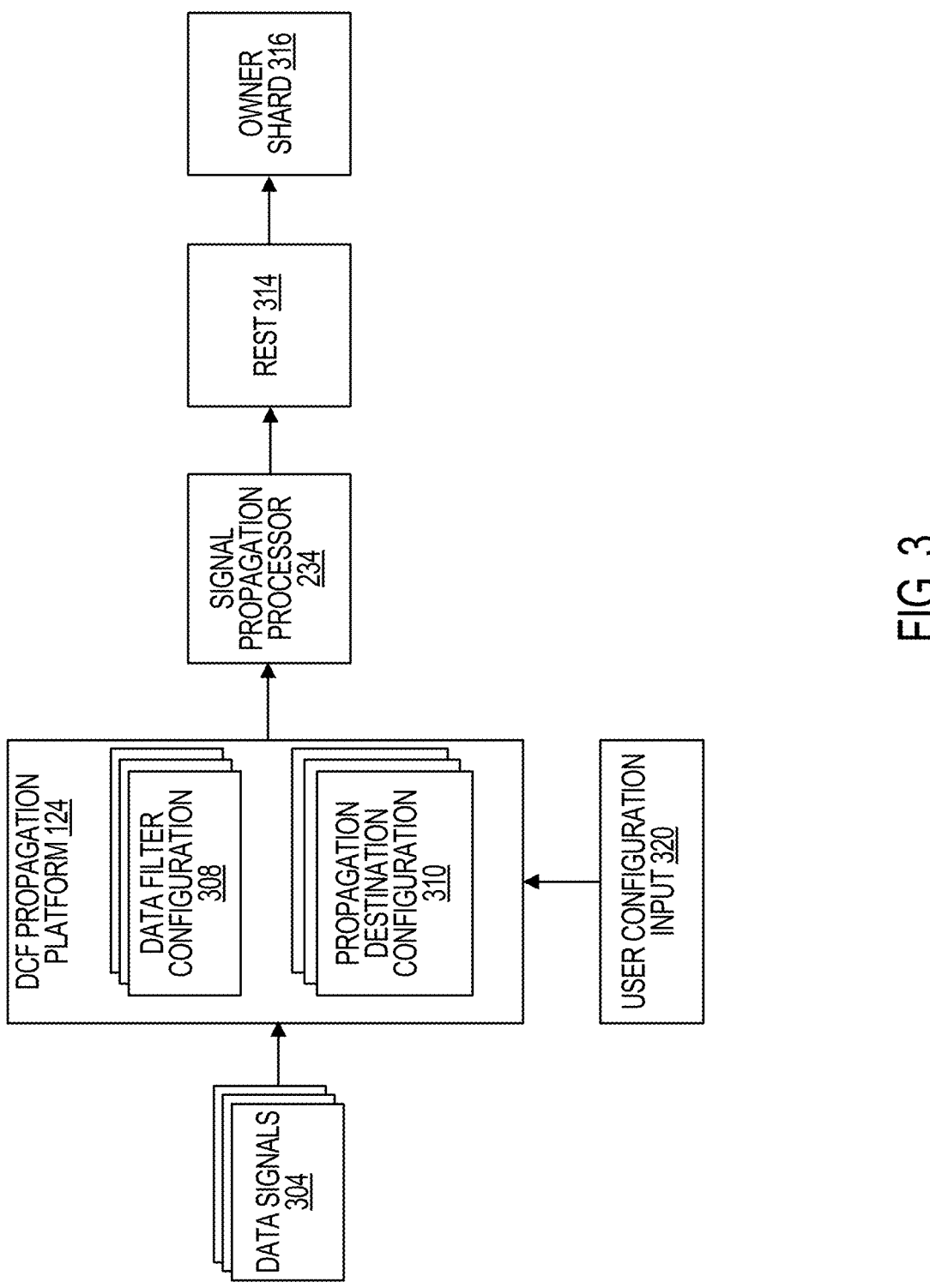
FIG. 3 is a block diagram illustrating a process of the declarative compute framework platform in accordance with one example embodiment.

FIG. 3 is a block diagram illustrating a process of the DCF propagation platform 124 in accordance with one example embodiment. The DCF propagation platform 124 receives data signals 304 that represent raw data inputs that are fed into the system for processing. Data signals 304 are essentially the initial set of data collected from various sources, which may include user interactions, system logs, transactional data, or any other form of digital data that needs to be managed and analyzed within the platform.

The DCF propagation platform 124 includes a data filter configuration 308 and a propagation destination configuration 310. The data filter configuration 308 selectively filters incoming data based on predefined criteria. These criteria ensure that only relevant data, which meets specific user-defined parameters, is processed further. This selective filtering is for optimizing system performance by reducing the processing load and focusing resources on data that is pertinent to the desired outcomes. In one example, the data filter configuration 308 generates a filter template based on the user configuration input 320. The propagation destination configuration 310 dictates the pathways through which the processed data is directed to its final destinations. The propagation destination configuration 310 specifies various endpoints where data should be stored or analyzed, depending on the requirements of the system or the preferences of the user. In one example, the propagation destination configuration 310 generates a destination template based on the user configuration input 320.

The signal propagation processor 234 receives the filtered data from the data filter configuration 308 and applies further processing to prepare it for replication based on the propagation destination configuration 310. The signal propagation processor 234 ensures that data handling is consistent with the defined configurations (based on the user configuration input 320) to maintain the integrity and accuracy of data propagation within the system.

REST 314 represents Representational State Transfer services within the DCF propagation platform 124. REST 314 is for facilitating communication and data exchange within the system, particularly in the context of web services that adhere to the REST architectural style. REST 314 enables the DCF propagation platform 124 to handle HTTP requests for interacting with data resources. This includes operations such as GET, POST, PUT, and DELETE, which correspond to reading, creating, updating, and deleting data, respectively. By leveraging RESTful services, the DCF propagation platform 124 ensures that these operations are performed in a stateless, cacheable, and uniform manner, enhancing the scalability and performance of data interactions.

The Owner Shard 316 is designed to hold data that is specifically related to a particular owner or set of owners. This could include user-specific data, project-related information, or any other data that is categorized based on ownership. The concept of sharding here refers to the division of data into distinct segments, each managed separately to enhance performance, scalability, and security.

By storing the filtered data in Owner Shard 316, the DCF propagation platform 124 can ensure that data is not only stored securely but also segmented in a way that respects ownership and access controls. This is particularly important in environments where data privacy and security are paramount. The owner shard 316 allows for efficient queries and operations on data subsets that are relevant to specific owners, thereby reducing overhead and improving response times for data access.

Figure 4:
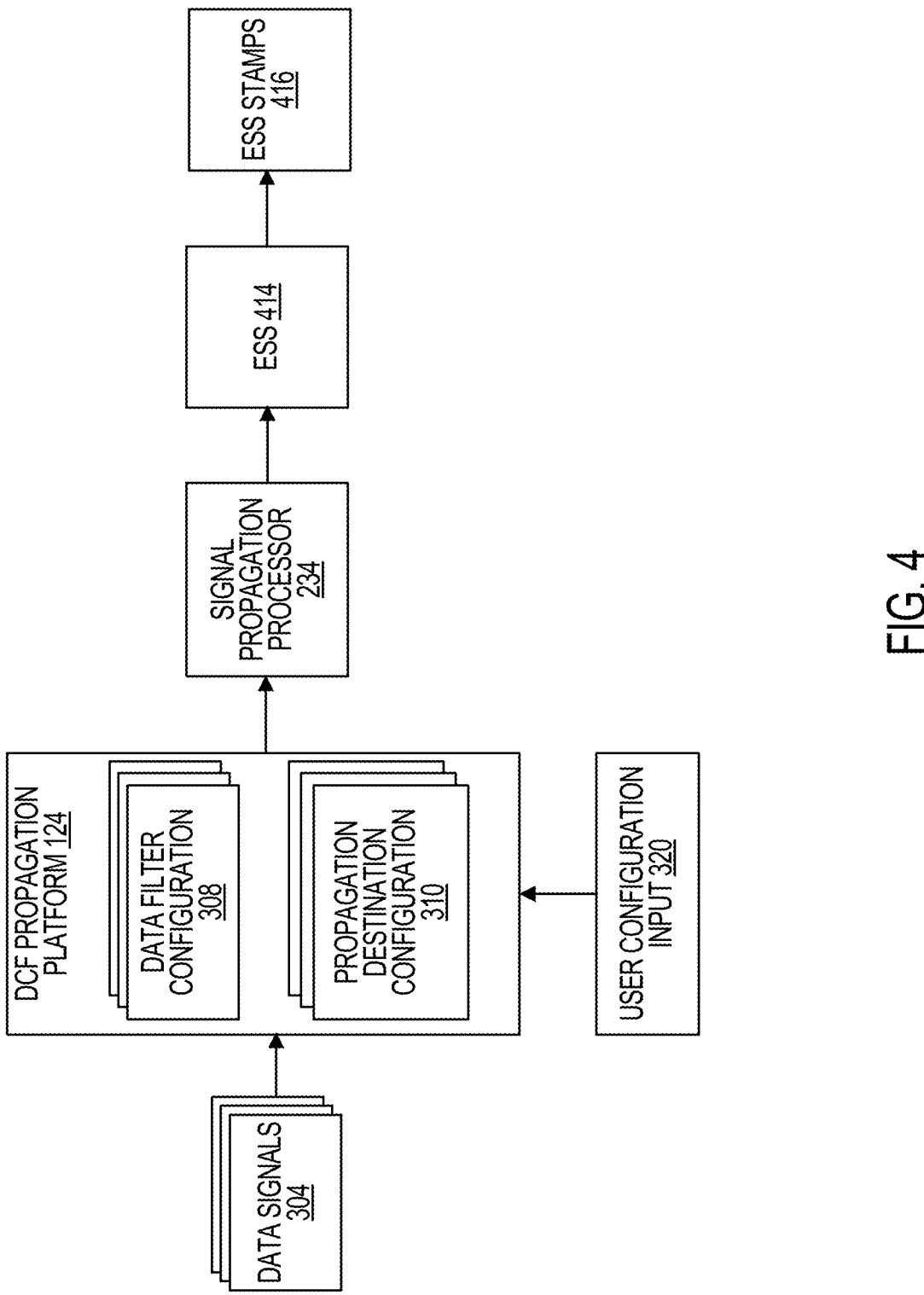
FIG. 4 is a block diagram illustrating a process of the declarative compute framework platform in accordance with one example embodiment.

FIG. 4 is a block diagram illustrating a process of the DCF propagation platform 124 in accordance with one example embodiment. FIG. 4 illustrates an example where the filtered data is stored according to an ESS signal propagation configuration. ESS 414 refers to the Elastic Scalable Storage component within the DCF propagation platform 124. ESS 414 is designed to provide a highly scalable and flexible storage solution that can dynamically adjust to the varying demands of data volume and processing load.

ESS 414 manages large-scale data storage needs, particularly in environments where data influx can be unpredictable and substantial. It supports the ability to scale storage resources up or down seamlessly, ensuring that the DCF propagation platform 124 can handle large datasets efficiently without compromising performance. This elasticity is particularly valuable in scenarios involving big data analytics, real-time data processing, or any situation where rapid scalability is essential.

The integration of ESS 414 into the DCF propagation platform 124 allows for a robust data management strategy that can accommodate growth and change over time. By leveraging clastic storage capabilities, the platform ensures that it can continue to perform optimally, even as data requirements evolve. This component not only enhances the storage capacity but also contributes to the overall resilience and adaptability of the system, making it well-suited for modern, data-intensive applications.

Furthermore, ESS 414 interacts with other components of the system, such as the Signal Propagation Processor (234) and the Propagation Destination Configuration (310), to ensure that data is not only stored efficiently but also routed and managed according to the defined data handling policies and procedures. This cohesive integration supports the platform's goal of delivering a comprehensive and scalable data propagation solution.

ESS STAMPS 416 refers to a specific implementation within the Elastic Scalable Storage (ESS) system, designed to manage and segment data storage into discrete units or "stamps." This component is for organizing data in a structured and efficient manner within the broader ESS framework. In other words, ESS STAMPS 416 are partitions or blocks within the Elastic Scalable Storage that allow for data to be stored in logically separated segments. Each stamp can be independently scaled, managed, and optimized based on specific data characteristics or access patterns. This modular approach to data storage not only enhances the manageability of large data volumes but also improves performance by localizing data operations to specific stamps, thereby reducing latency and increasing throughput.

The use of ESS STAMPS 416 within the DCF propagation platform 124 facilitates a high degree of flexibility and scalability in data storage. By segmenting data into stamps, the system can dynamically allocate resources where they are most needed, adapting to changes in data load or application demands without disrupting overall system performance. This is particularly advantageous in environments where data growth is rapid and unpredictable, as it allows the storage system to expand and contract as required.

Figure 5:
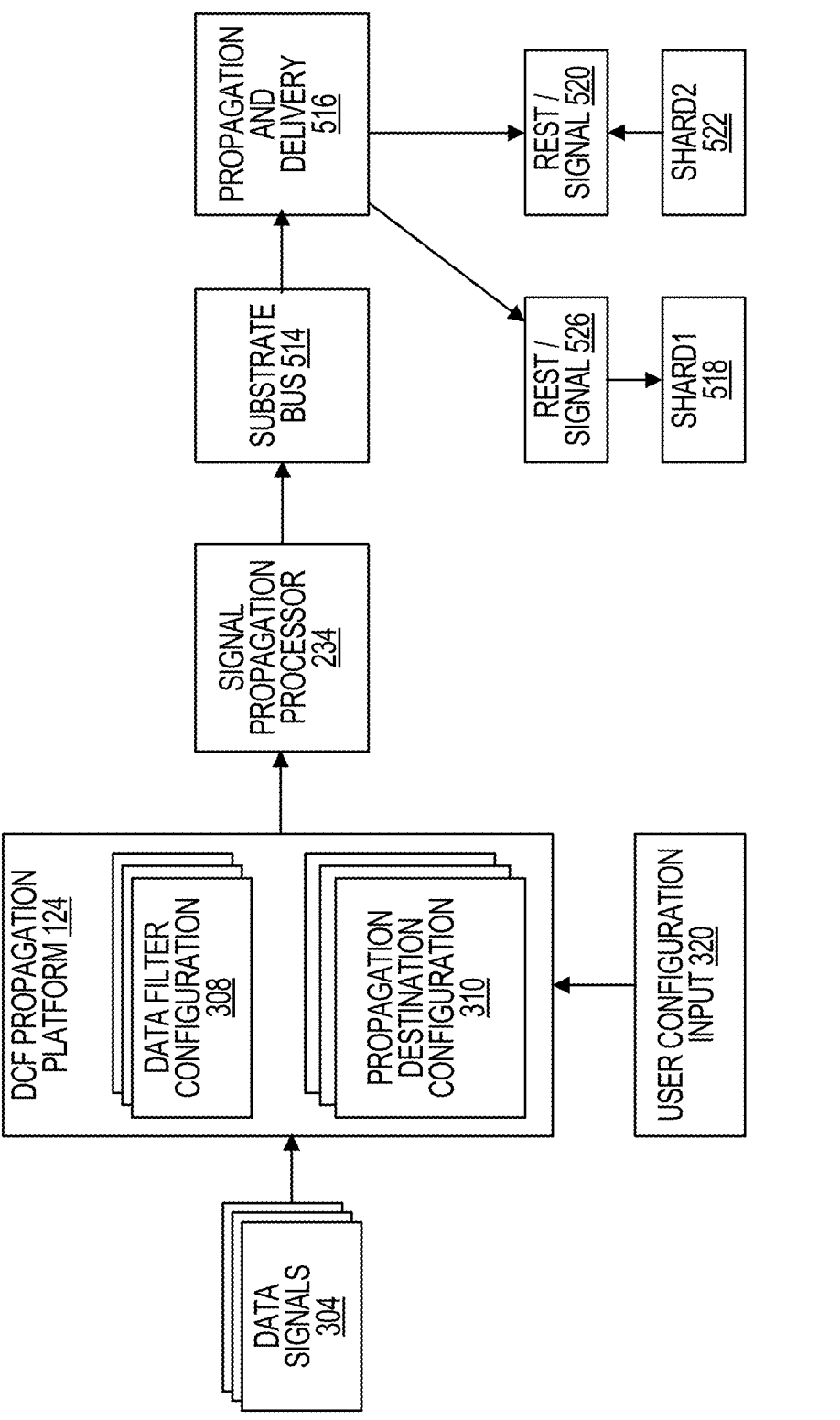
FIG. 5 is a block diagram illustrating a process of the declarative compute framework platform in accordance with one example embodiment.

FIG. 5 is a block diagram illustrating a process of the DCF propagation platform 124 in accordance with one example embodiment. FIG. 4 illustrates an example where the filtered data is stored in a substrate bus 514. The substrate bus 514 connects to propagation and delivery 516 for propagating and storing the filtered data in multiple shards (e.g., shard1 518 via REST/Signal 526, shard2 522 via REST/Signal 520).

Figure 6:
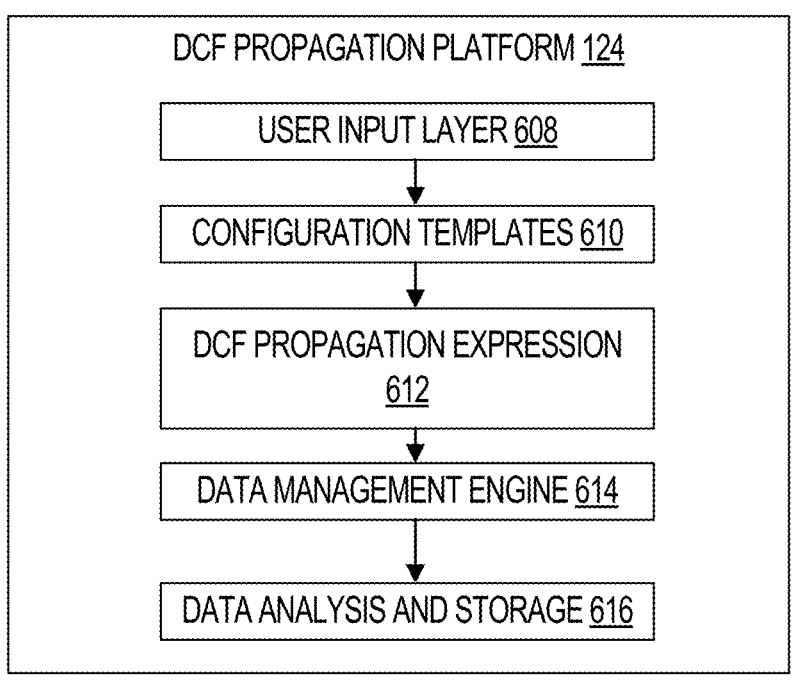
FIG. 6 is a block diagram illustrating a declarative compute framework platform in accordance with one example embodiment.

FIG. 6 is a block diagram illustrating a DCF propagation platform 124 in accordance with one example embodiment. The DCF propagation platform 124 includes a user input layer 608, configuration templates 610, DCF propagation expression 612, data management engine 614, and data analysis and storage 616.

The user input layer 608 is the initial point of interaction where users input their data or configuration preferences. It is designed to accept inputs in a declarative format, allowing users to specify what they need without detailing how the data should be processed. This simplifies the user experience and makes the system more accessible to users with varying levels of technical expertise.

Following the user input, the system utilizes configuration templates 610 to translate these inputs into actionable configurations. These templates are pre-defined yet customizable, ensuring that they can cater to a wide range of scenarios and user requirements. They play a crucial role in standardizing the data handling processes within the platform, enhancing consistency and reliability.

The DCF propagation expression 612 enables the translation of user inputs and configurations into specific data propagation expressions. These expressions define how data is captured, filtered, and routed throughout the system, ensuring that data flows are managed according to the defined business rules and logic.

The data management engine 614 processes and manages the data according to the configurations and expressions defined earlier. It handles the complexities of data storage, retrieval, and manipulation, ensuring that data integrity and security are maintained throughout the process.

The data analysis and storage 616 is responsible for storing the processed data and making it available for analysis. It supports various forms of data analysis, from simple queries to complex analytical models, providing valuable insights that can inform business decisions.

FIG. 7 illustrates an example routine 700 for operating the declarative compute framework platform. Although the example routine 700 depicts a particular sequence of operations, the sequence may be altered without departing from the scope of the present disclosure. For example, some of the operations depicted may be performed in parallel or in a different sequence that does not materially affect the function of the routine 700. In other examples, different components of an example device or system that implements the routine 700 may perform functions at substantially the same time or in a specific sequence.

According to some examples, the method includes receiving a declarative input that indicates an outcome for data handling at block 702. This allows users to specify their requirements in a straightforward manner without needing to understand the underlying complexities of the data processing logic.

According to some examples, the method includes identifying, from the declarative input, a predefined data filter configuration and a predefined data propagation configuration at block 704. In one example, the method identifies configuration templates based on the declarative input. The configuration templates include the predefined data filter configuration and a predefined data propagation configuration.

According to some examples, the method includes filtering incoming data (e.g., input stream) according to the predefined data filter configuration to generate filtered data at block 706.

According to some examples, the method includes replicating the filtered data to a data storage according to the predefined data propagation configuration at block 708.

FIG. 8 illustrates an example of user data in accordance with one example embodiment. The DCF propagation platform 124 captures example user data 804 (e.g., user behavior data of a file called "how to index my toy?").

FIG. 9 illustrates examples of destination configurations in accordance with one example embodiment. Data filtering configuration rule 902 illustrates a scenario for "WhoTouchedMyFile." Data destination rule 904 is for propagating to a common place called tenant share. Data destination rule 906 and data destination rule 908 are for propagating to an clastic storage. Data destination rule 910 is for propagating data to multiple destinations, such as members in the Authors group.

Figure 10:
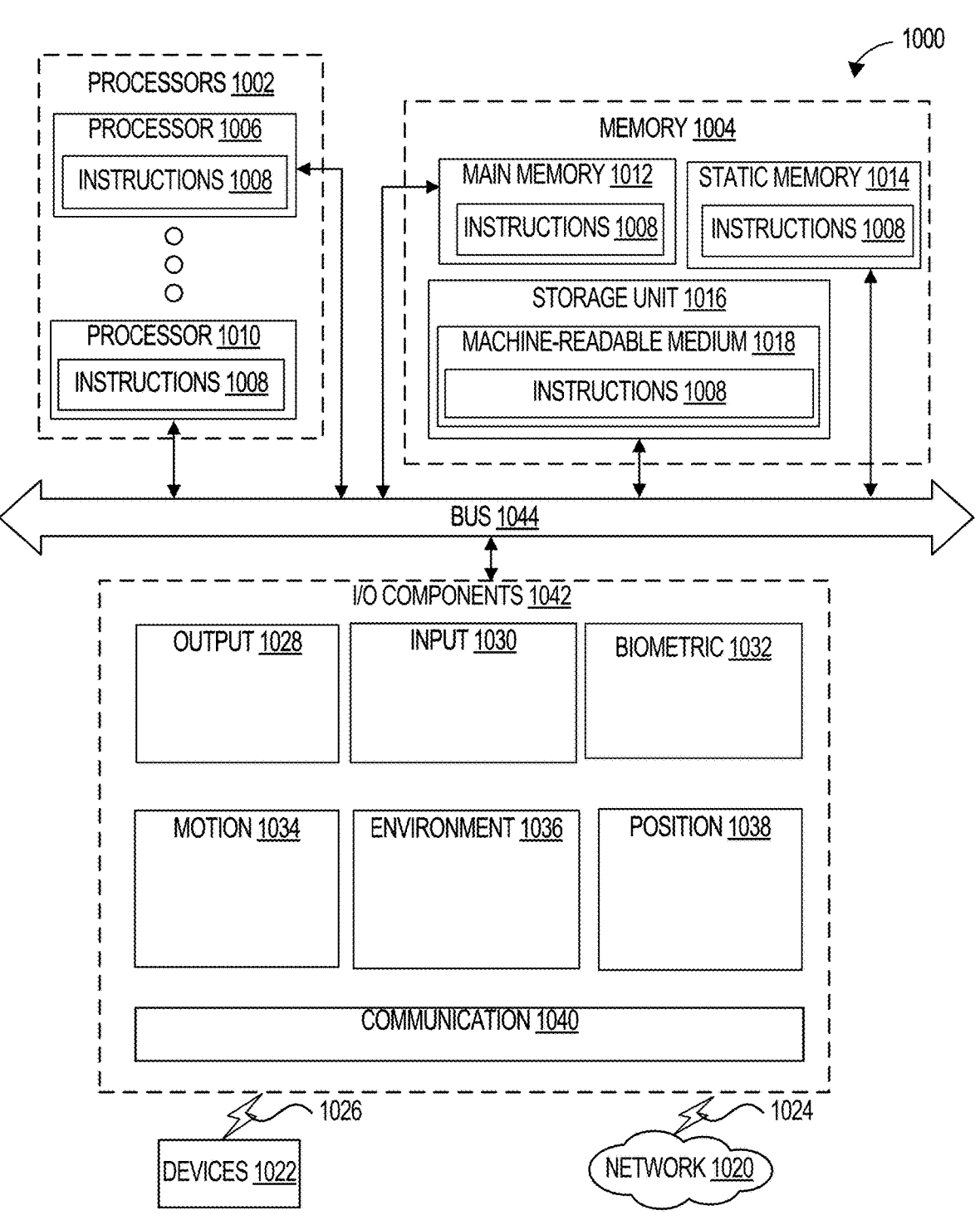
FIG. 10 is a diagrammatic representation of a machine in the form of a computer system within which a set of instructions may be executed for causing the machine to perform any one or more of the methodologies discussed herein, according to an example embodiment.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1042, which may be configured to communicate with each other via a bus 1044. In an example embodiment, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1042 may include a wide variety of components to receive input, provide output, produce output, transmit information, exchange information, capture measurements, and so on. The specific I/O components 1042 that are included in a particular machine will depend on the type of machine. For example, portable machines such as mobile phones may include a touch input device or other such input mechanisms, while a headless server machine will likely not include such a touch input device. It will be appreciated that the I/O components 1042 may include many other components that are not shown in FIG. 10. In various example embodiments, the I/O components 1042 may include output components 1028 and input components 1030. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1042 may include biometric components 1032, motion components 1034, environmental components 1036, or position components 1038, among a wide array of other components. For example, the biometric components 1032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 include acceleration sensor components (e.g., accelerometer), gravitation sensor components, rotation sensor components (e.g., gyroscope), and so forth. The environmental components 1036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1042 further include communication components 1040 operable to couple the machine 1000 to a network 1020 or devices 1022 via a coupling 1024 and a coupling 1026, respectively. For example, the communication components 1040 may include a network interface component or another suitable device to interface with the network 1020. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the processors 1002) and/or storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed embodiments.

The instructions 1008 may be transmitted or received over the network 1020, using a transmission medium, via a network interface device (e.g., a network interface component included in the communication components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a method comprising: receiving a declarative input that indicates an outcome for data handling; identifying, from the declarative input, a predefined data filter configuration and a predefined data propagation configuration; filtering incoming data according to the predefined data filter configuration to generate filtered data; and replicating the filtered data to a data storage according to the predefined data propagation configuration.

In Example 2, the subject matter of Example 1 includes, provisioning, based on the predefined data propagation configuration, an elastic scalable storage stamp to host the filtered data; wherein the incoming data comprise a stream of data indicative of user interactions of an application.

In Example 3, the subject matter of Example 2 includes, applying a machine learning algorithm to the filtered data stored at the data storage to identify patterns and trends of the user interactions.

In Example 4, the subject matter of Examples 1-3 includes, wherein the predefined data filter configuration and the predefined data propagation configuration are generated using a language model that captures user behavior data and transforms the user behavior data into a single line of configuration that represents where the filtered data is to be replicated.

In Example 5, the subject matter of Examples 1-4 includes, wherein the declarative input includes specifications for data filtering based on data signal types and user properties.

In Example 6, the subject matter of Examples 1-5 includes, wherein the declarative input is in a structured format that includes fields for specifying data types, desired data transformations, and destination rules.

In Example 7, the subject matter of Examples 1-6 includes, wherein the predefined data filter configuration and the predefined data propagation configuration operate using a kernel notification event model with a REST Signal model API.

In Example 8, the subject matter of Examples 1-7 includes, wherein the predefined data propagation configuration indicates multiple data replication destinations based on user-defined criteria in the declarative input.

In Example 9, the subject matter of Example 8 includes, wherein the user-defined criteria indicate a data propagation rule based on a contract between parties, users identified in a post of a social network application, or posting notifications.

In Example 10, the subject matter of Examples 1-9 includes, replicating the filtered data near real-time across different types of storage systems, including at least one of a cloud-based storage system or a local storage system, wherein the different types of storage systems include at least one of a user shard, a group shard, a tenant shard, or an clastic shard within a substrate.

Example 11 is a computing apparatus comprising: a processor; and a memory storing instructions that, when executed by the processor, configure the apparatus to perform operations comprising: receive a declarative input that indicates an outcome for data handling; identify, from the declarative input, a predefined data filter configuration and a predefined data propagation configuration; filter incoming data according to the predefined data filter configuration to generate filtered data; and replicate the filtered data to a data storage according to the predefined data propagation configuration.

In Example 12, the subject matter of Example 11 includes, wherein the instructions further configure the apparatus to: provision, based on the predefined data propagation configuration, an elastic scalable storage stamp to host the filtered data; wherein the incoming data comprise a stream of data indicative of user interactions of an application.

In Example 13, the subject matter of Example 12 includes, wherein the instructions further configure the apparatus to: apply a machine learning algorithm to the filtered data stored at the data storage to identify patterns and trends of the user interactions.

In Example 14, the subject matter of Examples 11-13 includes, wherein the predefined data filter configuration and the predefined data propagation configuration are generated using a language model that captures user behavior data and transforms the user behavior data into a single line of configuration that represents where the filtered data is to be replicated.

In Example 15, the subject matter of Examples 11-14 includes, wherein the declarative input includes specifications for data filter based on data signal types and user properties.

In Example 16, the subject matter of Examples 11-15 includes, wherein the declarative input is in a structured format that includes fields for specifying data types, desired data transformations, and destination rules.

In Example 17, the subject matter of Examples 11-16 includes, wherein the predefined data filter configuration and the predefined data propagation configuration operate using a kernel notification event model with a REST Signal model API.

In Example 18, the subject matter of Examples 11-17 includes, wherein the predefined data propagation configuration indicates multiple data replication destinations based on user-defined criteria in the declarative input, wherein the user-defined criteria indicate a data propagation rule based on a contract between parties, users identified in a post of a social network application, or post notifications.

In Example 19, the subject matter of Examples 11-18 includes, wherein the instructions further configure the apparatus to: replicate the filtered data near real-time across different types of storage systems, including at least one of a cloud-based storage system or a local storage system, wherein the different types of storage systems include at least one of a user shard, a group shard, a tenant shard, or an elastic shard within a substrate.

Example 20 is a non-transitory computer-readable storage medium, the computer-readable storage medium including instructions that when executed by a computer, cause the computer to: receive a declarative input that indicates an outcome for data handling; identify, from the declarative input, a predefined data filter configuration and a predefined data propagation configuration; filter incoming data according to the predefined data filter configuration to generate filtered data; and replicate the filtered data to a data storage according to the predefined data propagation configuration.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method comprising:
receiving a declarative input that indicates an outcome for data handling, wherein the declarative input includes specifications for data filtering based on data signal types and user properties, the data signal types characterizing user-generated or system-generated data, wherein the data signal types comprising one or more categories selected from clicks, transactions, log entries, or sensor readings, and wherein the user properties define user-specific attributes and comprise attributes of the user generating the data signal, including at least one of user role, user identity, user location, or user profile information, wherein the data filtering is performed by applying rules that conditionally include or exclude data based on both the data signal type and the user properties;
identifying a predefined data filter configuration and a predefined data propagation configuration from the specifications for data filtering based on data signal types and user properties;
filtering incoming data according to the predefined data filter configuration to generate filtered data; and
replicating the filtered data to a data storage according to the predefined data propagation configuration.

2. The method of claim 1, further comprising:

provisioning, based on the predefined data propagation configuration, an elastic scalable storage stamp to host the filtered data;

wherein the incoming data comprise a stream of data indicative of user interactions of an application.

3. The method of claim 2, further comprising:

applying a machine learning algorithm to the filtered data stored at the data storage to identify patterns and trends of the user interactions.

4. The method of claim 1, wherein the predefined data filter configuration and the predefined data propagation configuration are generated using a language model that captures user behavior data and transforms the user behavior data into a single line of configuration that represents where the filtered data is to be replicated.

5. The method of claim 1, wherein the declarative input is in a structured format that includes fields for specifying data types, desired data transformations, and destination rules.

6. The method of claim 1, wherein the predefined data filter configuration and the predefined data propagation configuration operate using a kernel notification event model with a REST Signal model API.

7. The method of claim 1, wherein the predefined data propagation configuration indicates multiple data replication destinations based on user-defined criteria in the declarative input.

8. The method of claim 7, wherein the user-defined criteria indicate a data propagation rule based on a contract between parties, users identified in a post of a social network application, or posting notifications.

9. The method of claim 1, further comprising:

replicating the filtered data near real-time across different types of storage systems, including at least one of a cloud-based storage system or a local storage system, wherein the different types of storage systems include at least one of a user shard, a group shard, a tenant shard, or an elastic shard within a substrate.

10. A computing apparatus comprising:

a processor; and a memory storing instructions that, when executed by the processor, configure the apparatus to perform operations comprising:

receiving a declarative input that indicates an outcome for data handling, wherein the declarative input includes specifications for data filtering based on data signal types and user properties, the data signal types characterizing user-generated or system-generated data, wherein the data signal types comprising one or more categories selected from clicks, transactions, log entries, or sensor readings, and wherein the user properties define user-specific attributes and comprise attributes of the user generating the data signal, including at least one of user role, user identity, user location, or user profile information, wherein the data filtering is performed by applying rules that conditionally include or exclude data based on both the data signal type and the user properties;

identifying a predefined data filter configuration and a predefined data propagation configuration from the specifications for data filtering based on data signal types and user properties;

filtering incoming data according to the predefined data filter configuration to generate filtered data; and replicating the filtered data to a data storage according to the predefined data propagation configuration.

11. The computing apparatus of claim 10, wherein the instructions further configure the apparatus to:

provision, based on the predefined data propagation configuration, an elastic scalable storage stamp to host the filtered data;

wherein the incoming data comprise a stream of data indicative of user interactions of an application.

12. The computing apparatus of claim 11, wherein the instructions further configure the apparatus to:

apply a machine learning algorithm to the filtered data stored at the data storage to identify patterns and trends of the user interactions.

13. The computing apparatus of claim 10, wherein the predefined data filter configuration and the predefined data propagation configuration are generated using a language model that captures user behavior data and transforms the user behavior data into a single line of configuration that represents where the filtered data is to be replicated.

14. The computing apparatus of claim 10, wherein the declarative input is in a structured format that includes fields for specifying data types, desired data transformations, and destination rules.

15. The computing apparatus of claim 10, wherein the predefined data filter configuration and the predefined data propagation configuration operate using a kernel notification event model with a REST Signal model API.

16. The computing apparatus of claim 10, wherein the predefined data propagation configuration indicates multiple data replication destinations based on user-defined criteria in the declarative input, wherein the user-defined criteria indicate a data propagation rule based on a contract between parties, users identified in a post of a social network application, or post notifications.

17. The computing apparatus of claim 10, wherein the instructions further configure the apparatus to:

replicate the filtered data near real-time across different types of storage systems, including at least one of a cloud-based storage system or a local storage system, wherein the different types of storage systems include at least one of a user shard, a group shard, a tenant shard, or an elastic shard within a substrate.

18. A non-transitory computer-readable storage medium, the computer-readable storage medium including instructions that when executed by a computer, cause the computer to:

receive a declarative input that indicates an outcome for data handling, wherein the declarative input includes specifications for data filtering based on data signal types and user properties, the data signal types characterizing user-generated or system-generated data, wherein the data signal types comprising one or more categories selected from clicks, transactions, log entries, or sensor readings, and wherein the user properties define user-specific attributes and comprise attributes of the user generating the data signal, including at least one of user role, user identity, user location, or user profile information, wherein the data filtering is performed by applying rules that conditionally include or exclude data based on both the data signal type and the user properties;

identify a predefined data filter configuration and a predefined data propagation configuration from the specifications for data filtering based on data signal types and user properties;

filter incoming data according to the predefined data filter configuration to generate filtered data; and replicate the filtered data to a data storage according to the predefined data propagation configuration.

* * * * *